United States Patent [19]
Wilkins

[11] Patent Number: 5,215,150
[45] Date of Patent: Jun. 1, 1993

[54] WINGED SUBSOIL PLOW

[75] Inventor: Walter B. Wilkins, Lubbock, Tex.

[73] Assignee: Phares & Wilkins Manufacturing, Inc., Lubbock, Tex.

[21] Appl. No.: 657,534

[22] Filed: Feb. 19, 1991

[51] Int. Cl.$^5$ .............................................. A01B 13/08
[52] U.S. Cl. ..................................... 172/1; 172/699; 172/713; 172/686
[58] Field of Search ............... 172/196, 699, 700, 720, 172/713, 1, 159, 192, 201, 686, 697, 694, 772.5, 766, 730

[56] References Cited

U.S. PATENT DOCUMENTS

| | | | |
|---|---|---|---|
| 486,614 | 11/1892 | Lindgren | 172/686 X |
| 539,289 | 5/1895 | McWhinney | 172/700 |
| 769,897 | 9/1904 | Geddes | 172/699 |
| 1,549,633 | 8/1925 | Uzemack | 172/192 |
| 2,730,030 | 1/1956 | Chambers | 172/686 X |
| 3,048,229 | 8/1962 | Simpson | 172/699 |
| 3,202,222 | 8/1965 | Norris | 172/699 X |
| 4,079,789 | 3/1978 | Byrd et al. | 172/699 X |
| 5,103,918 | 4/1992 | Puntoni | 172/699 |

FOREIGN PATENT DOCUMENTS

| | | | |
|---|---|---|---|
| 0865142 | 9/1981 | U.S.S.R. | 172/699 |
| 1093269 | 5/1984 | U.S.S.R. | 172/700 |
| 1107764 | 8/1984 | U.S.S.R. | 172/720 |
| 2143414 | 2/1985 | United Kingdom | 172/720 |

Primary Examiner—Dennis L. Taylor
Assistant Examiner—Jeffrey L. Thompson
Attorney, Agent, or Firm—Wendell Coffee; Tracy Druce

[57] ABSTRACT

A subsoil plowing implement having winged subsoil plows that break and lift the soil thereby loosening said soil. The plows are mounted so that an upper surface of the wing of the plow may be oriented at varying degrees of incline to horizontal. Spikes are located at a leading edge of the wing and a shank so that said spikes precede the wing and shank through the soil. The spikes initially break the ground and reduce the resistance that the wing and shank experience as they progress through the soil. A bevelled and sharpened deflection strip fixed to a leading edge of the shank making said shank more knifelike and allowing it to cut through the soil with reduced friction. By varying the arrangement and orientation of the plows, areas of loosened soil with different cross-sectional shapes are created.

29 Claims, 3 Drawing Sheets

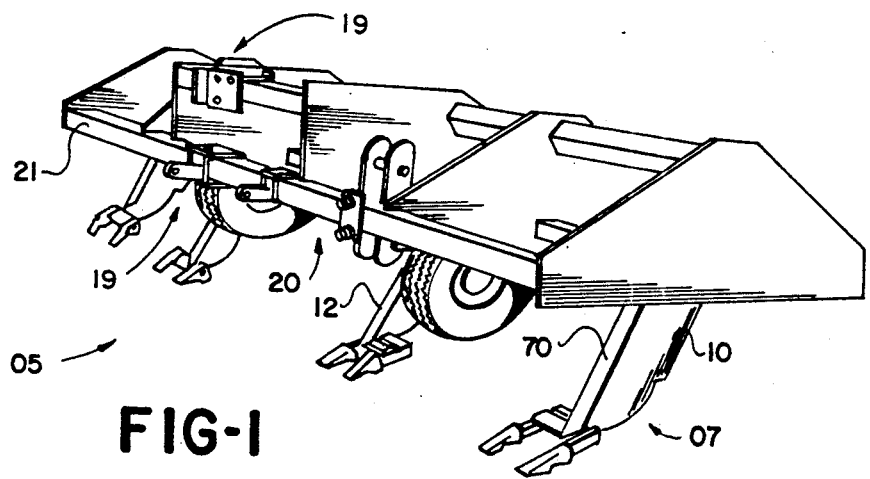
FIG-1
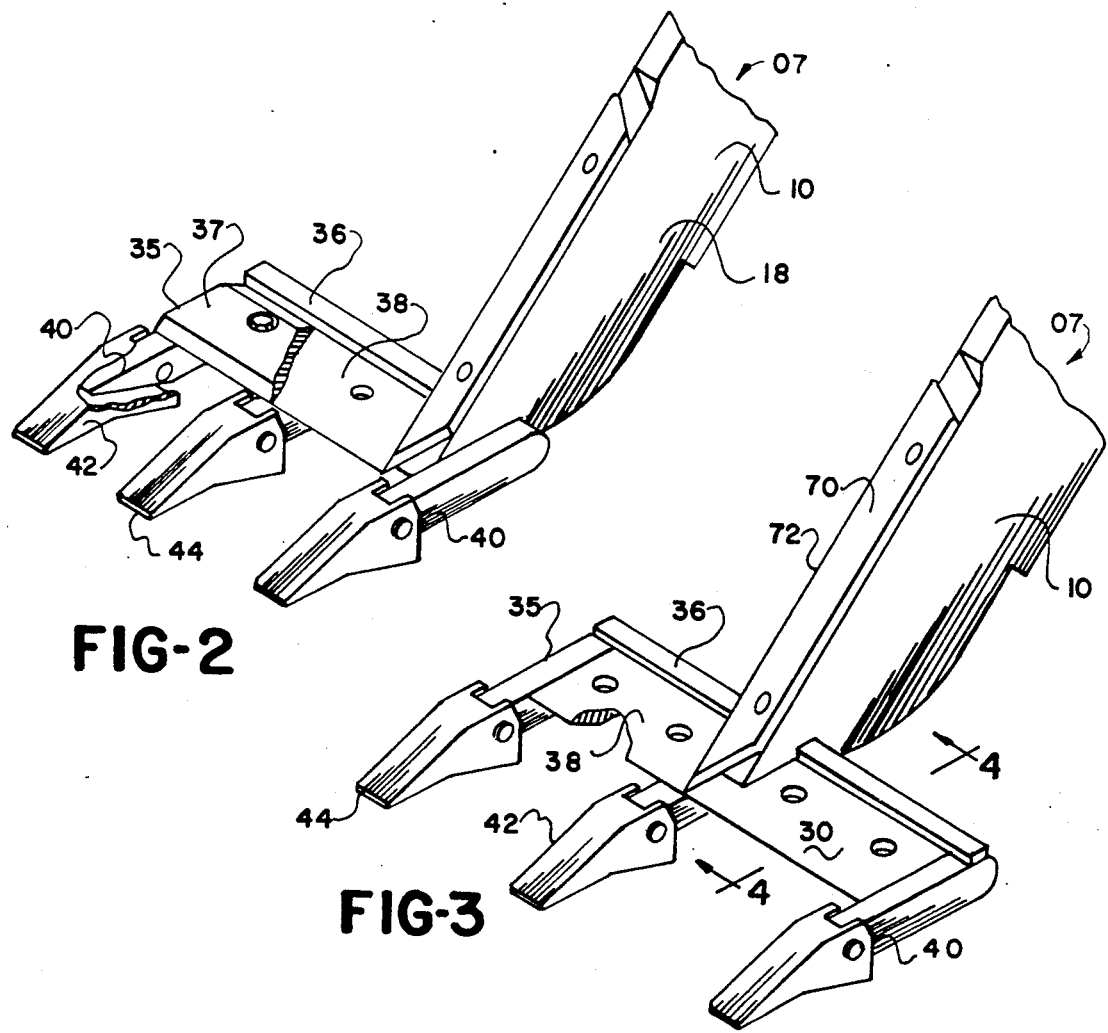
FIG-2
FIG-3

WINGED SUBSOIL PLOW

BACKGROUND OF THE INVENTION

(1) Field of the Invention

This invention relates to soil preparation devices. More particularly, this invention relates to agricultural subsoil plowing implements capable of cutting and raising soil at depths exceeding one foot below the ground's surface for the purpose of loosening said soil. Those with ordinary skill in the art are farmers involved in deep tillage or subsoil plowing.

(2) Description of the Related Art

It has long been recognized as desirable to be able to break and loosen the soil from below the surface. Many devices have been invented that are designed to meet this goal. Generally, the limiting factor for these types of devices is the depth at which they may be positioned below the ground. At relatively shallow depths, the drag experienced overpowers the ability of the drafting tractor to pull the implement through the soil.

A plow is disclosed in U.S. Pat. No. 769,897 to GEDDES that includes a wear plate, a cutting blade, and a supporting plate taking the form of a laterally extending wing. GEDDES intended for his invention to be applied not only to turning plows, but also to listers, cotton plows, and a great variety of species of plows and similar earth engaging devices.

U.S. Pat. No. 774,324 to STROM discloses a plow having a point of generally triangular contour, a standard engaging the attaching arm projecting upwardly and rearwardly over the point, and a heel that supports a lateral cutting mechanism. Specifically, the GEDDES device is intended to be capable of cutting and raising the ground without encountering great resistances.

U.S. Pat. No. 2,047,310 to COHEA discloses a deep tillage subsoiler. The deep tillage subsoiler of COHEA includes flat side members that have a blade connected between them so that the blade is transverse to said side members and a direction of draft. The blade is inclined to horizontal so that as it is passed through the soil by the flat side members it raises and loosens the dirt above the blade.

A cultivator implement is disclosed in U.S. Pat. No. 2,992,690 to RABUSE. RABUSE shows a cultivator implement having a modified sweep adapted to be mounted on a mobile vehicle for cultivating soil surrounding row crops in order to destroy weeds and loosen soil.

A soil cultivating implement is disclosed in U.S. Pat. No. 4,548,276 to LINGER. The implement of LINGER is a tool that includes a blade with a lower inclined portion and an upper upright portion that are interconnected by an intermediate portion. The inclined portion of the implement is moved edgewise through the ground so as to lift soil lying above that inclined portion. The inclined portion of the implement lies at an acute angle to vertical.

SUMMARY OF THE INVENTION

(1) Progressive Contribution to the Art

A primary benefit of this invention is that it enables a farmer to more thoroughly loosen soil from greater depths below the ground's surface. Because of the invention's design, wings of the subsoil plows may be placed at depths greater than 24 inches and the implement still be operational.

One of the reasons that this winged subsoiler can be operated at greater depths is the incorporation of spikes along the leading edge of the wing with at least one spike attached at the distal end of the wing and another at the bottom end of the shank ahead of said shank. Each spike has a shoe over it that is wear resistant and exchangeable. Wings of varying lengths from about twelve inches to about sixteen inches are preferred. More spikes may be attached to the longer wings. The greater the length of the wing, the greater the subsequent loosened area of soil created by the plow and the greater the drag experienced by the plow.

As the plow is drafted through the soil, the shoed spikes are most forward and are the first to encounter unbroken soil and begin the breaking process. As the wedge-shaped spike progresses through the soil, it continues breaking the soil until that area of soil is encountered by the wing that follows the spikes through the ground. The soil encountered by the wing has been initially broken and loosened by the spikes so that there is less resistance to said wing passing through the soil. The initial breakage affected by the spikes allows the subsoil plow to be more "slippery" as said plow is drafted through the soil.

Each shoed spike angles downward below the wing so that the spike's tendency is to dig into the ground when soil is encountered. In this configuration, a top surface of the spike creates an angle below horizontal. The spikes further loosen the soil as they attempt to dig deeper into the soil but are prevented from doing so by the elevationally fixed implement.

A top surface of the wing is also oriented at an angle below horizontal but said angle at which the wing deviates below horizontal is not as great as that of the spike's top surface. The leading edges of the spike and wing are the lower ends of each and as such cause both to be inclined from their front to back as they are drafted through the soil.

In the preferred embodiment, a lengthwise axis of each wing is horizontally oriented. In this configuration, soil is raised and lifted directly upward by the inclined wing as said wing passes through the soil. In addition to being lifted by the top surface of the wing, there is an additional plate fixed to the top surface of the wing near the back edge. The plate gives an added degree of lift to the soil as the wing passes beneath said soil. In effect, this plate gives the soil one last "kick" as said soil is raised by the wing. Upward movement of the soil continues after the wing has passed due to the above referenced kick and then falls back into place behind the passing wing loosened.

This directly upward raising of the soil affects a more complete loosening and breaking of the soil than other known subsoilers that lift the soil at an angle to vertical. This invention directs all of its force on the soil directly upward where there is room for the soil to expand and become loosened. Those that have angled shanks or wings lose a degree of their loosening efficiency by having a component of the raising force tending to push the soil into adjacent compacted ground instead of directly upward into the air.

While the lifting and raising of the soil is directed upwardly, the resulting disturbance at the ground's surface after the soil has been raised and allowed to fall back into place is minimal. This is due primarily to the thorough loosening caused by the plows thereby allowing the soil to fall back into the basin created by the plows with little interstitial air within the soil. Furthermore, a more complete breaking of the soil prevents large boulders from coming to or occurring at the top of the loosened bed.

A further benefit of this invention is that the orientation of the top surfaces of the wings and spikes with respect to horizontal is variable. The incline of the wings and spikes may be either increased or decreased at the mounting connection between the shank and the frame. By varying the incline of the wing, the degree to which the soil is raised may be altered. If a greater loosening of the soil is desired and the pulling tractor has the requisite power and traction, the incline of the top surface of the wing may be increased so as to increase the lifting and raising of the soil and thereby increase the resulting loosening of said soil.

The incline of the spike and wing may also be varied to adjust the degree of resistance experienced by the invention as it is drafted through the soil. If a particular setting is causing too much drag for the tractor to overcome, the incline of the wing may be decreased so that the plow slips more easily through the soil.

Still a further benefit of this device is that the loosened area of soil created by the plows is rather specifically defined. There is a high degree of loosening in the desired areas directly above and at angles upward from the bottom of the shank and the distal end of the wings, but outside that area the soil is left undisturbed and still compacted. These areas of compacted soil provide a base for the wheels of the tractor to obtain traction and also prevents the driving wheels from becoming bogged down in loosened soil.

The winged subsoil plow creates strips of loosened soil having unique cross-sectional shapes. These shapes are most clearly shown in FIGS. 6 through 8 of the attached drawings. A L-shaped and a T-shaped embodiment of the invention is contemplated. Referring to the drawings, the different cross-sections of loosened soil created by the two embodiments is clearly visible. In different situations, each configuration provides unique benefits. Additionally, by arrangement of the plows, either individual strips of loosened soil may be created by each plow or by placing the shanks of two plows more closely together a joined cross-sectional area may be created. The benefit of having this ability to have varying cross-sectional shapes is that the plowing implement as a whole may be tailored to meet the needs of different environments. For example, in a more arid climate where there is less moisture, the individual strips of loosened ground provided from more widely distanced plows is desirable. The reason being that there is less area of loosened soil and less moisture is required to maintain the soil at a moisture level that will support crops. In an area where water is more plentiful, joined beds are more desirable. By having a greater area of loosened soil, the joined strip provides a larger basin within the ground to hold more moisture. All strips created by this invention benefit from the fact that the more thoroughly loosened soil renders a greater ability to retain moisture.

Side walls and floors about the basin are created by the ground bordering the soil that has been loosened. The undisturbed and still compacted ground tends to hold the water collected within the basins. Furthermore, the walls of the basins are inclined upward from the bottoms of the strips so that water is directed into the basins from the ground's surface. This is beneficial in that more natural precipitation is retained for longer periods of time thereby supporting crops for a longer period of time. Additionally, if the land is irrigated, less pumped water is required to support the same crop which would require more water if another plowing implement had been used.

Because of the increased plowing depth made possible by this invention, a plant's tap root can grow more deeply into loosened soil before said root hits hard ground at the bottom of the basin. Furthermore, the loosened area of soil provides a moisture retaining basin into which the smaller feeder roots easily penetrate. By making it easier for the roots to penetrate the soil and obtain the needed water for the plant, less energy is used to push the roots through the soil and therefore more energy is available for growth of the crop.

As previously mentioned, the design of this invention causes it to be less resistant and more slippery as it is drafted through the soil. For this reason, more plows may be attached to a single frame being pulled by a given tractor. By being able to mount more plows to the frame and loosen more soil at one time with the same tractor, the travel distance of that tractor is reduced with respect to a given ground surface area. This produces savings in both money and time with respect to fuel consumption, equipment usage and labor. In this same vein, the reduction in drag of this design makes it possible for a smaller tractor to pull an implement according to said design of equal loosening capabilities of other known devices. This is of particular benefit to the small farmer who may be only able to afford the smaller tractors and greatly needs to economize his farming operation.

(2) Objects of this Invention

An object of this invention is to provide a subsoil plowing implement capable of raising and loosening soil from depths equal to and greater than two feet below the ground's surface.

Another object of this invention is to create strips of plowed ground that have superior abilities to retain moisture within the loosened soil of the strip.

Further objects are to achieve the above with devices that are sturdy, durable, simple, safe, efficient, versatile, ecologically compatible, energy conserving, and reliable, yet easy to install, operate, and maintain.

Other objects are to achieve the above with a method that is rapid, versatile, ecologically compatible, energy conserving, efficient, and does not require highly skilled people to implement said method.

The specific nature of the invention, as well as other objects, uses, and advantages thereof, will clearly appear from the following description and from the accompanying drawings, the different views of which are not necessarily scale drawings.

BRIEF DESCRIPTION OF THE DRAWINGS

FIG. 1 is a perspective View of the plow implement from the leading side of said implement showing plows with one wing attached to each shank.

FIG. 2 is a perspective view of an L-shaped plow.

FIG. 3 is a perspective view of an inverted T-shaped plow.

Figure 4:
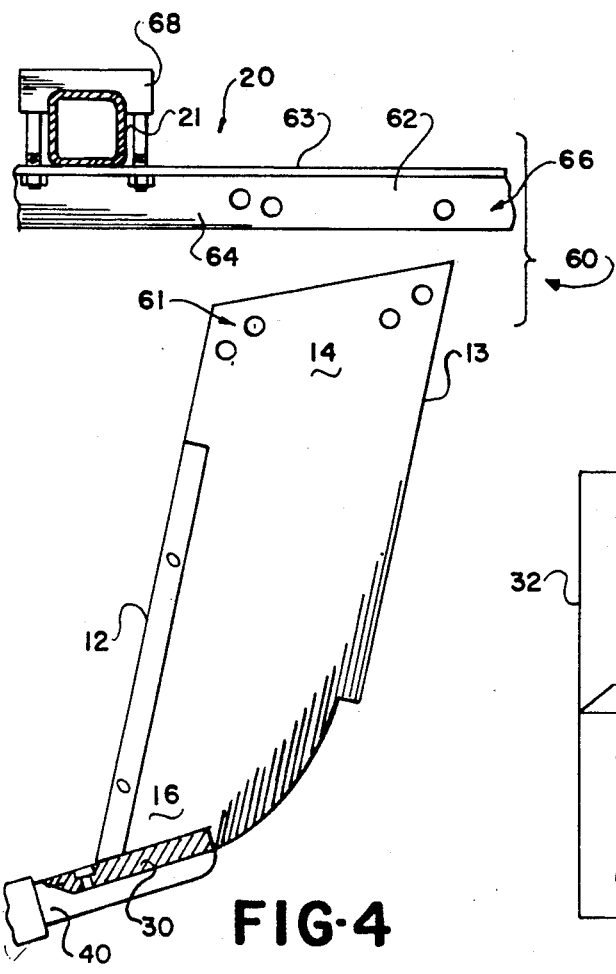
FIG. 4 is an exploded side elevational view of a plow mounted upon the frame viewing from a winged side. A section across the wing as shown in FIG. 3 is illustrated.
Figure 5:
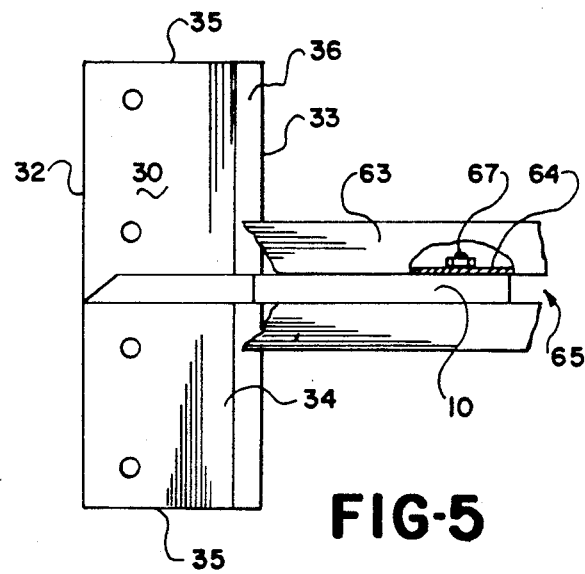
FIG. 5 is a top plan view of an inverted T-shaped plow mounted to the frame.

As an aid to correlating the terms of the claims to the exemplary drawings, the following catalog of elements and steps is provided:

| | |
|---|---|
| 05 | plow implement |
| 07 | subsoil plow |
| 10 | shank |
| 11 | shank pairs |
| 12 | leading edge of shank |
| 13 | trailing edge of shank |
| 14 | top of shank |
| 16 | bottom of shank |
| 18 | lateral side of shank |
| 19 | three point hitch |
| 20 | frame |
| 21 | tool bar |
| 30 | wing |
| 32 | leading edge of wing |
| 33 | trailing edge of wing |
| 34 | main body of wing |
| 35 | distal end of wing |
| 36 | lifting plate |
| 37 | wear resistant plate |
| 38 | top surface of the wing |
| 40 | spike |
| 42 | shoe |
| 44 | shoe tip |
| 60 | mounting connection |
| 61 | offset holes |
| 62 | angle iron |
| 63 | horizontal flange |
| 64 | upright flange |
| 65 | pair of angle irons |
| 66 | series of holes |
| 67 | shank bolt |
| 68 | plate |
| 70 | deflection strip |
| 72 | leading beveled edge |
| 100 | strip of plowed ground |
| 112 | ground surface |
| 114 | side wall of loosened soil |
| 116 | bottom limit of loosened soil |
| 118 | mound shaped projection of unbroken soil |
| 120 | broken and loosened soil |
| 122 | undisturbed soil |
| 130 | distanced L-shaped plows loosening configuration |
| 132 | inverted T-shaped plow loosening configuration |
| 134 | paired L-shaped plows loosening configuration |

DESCRIPTION OF THE PREFERRED EMBODIMENTS

Referring to the accompanying drawings, a plow implement 05 may be seen. It is contemplated that the preferred embodiments of the invention shown in the drawings would be used in an agricultural setting. The implement 05 is drafted by an agricultural tractor by means for drafting in the form of three point hitch 19 on frame 20. A direction of draft or a direction of travel is defined by the forward motion of the drafting tractor when the path of said tractor is straight.

At least one subsoil plow 07 is mounted to the frame 20 of the implement 05. The frame 20 comprises more than one tool bar 21 where each tool bar 21 is a beam constructed from tubular steel having a rectangularly shaped cross-section and where each of said tool bars 21 has a lengthwise axis perpendicular to the direction of draft. The frame 20 is maintained at a constant elevation above the ground's surface during operation. The tool bar frame 20 as described above is well known.

Each subsoil plow 07 to be installed upon the frame 20 is mounted to said frame 20 by mounting connection 60. The mounting connection 60 comprises a pair of angle irons 65 where each of said pairs 65 includes two angle irons 62. Each angle iron 62 of each pair 65 is connected between two of the tool bars 21. Additionally, each angle iron 62 is oriented so that a lengthwise axis of each iron 62 is parallel to the direction of draft and perpendicular to the lengthwise axes of the tool bars 21. When fastened to the tool bars 21, each angle iron 62 has a horizontal flange 63 that is adjacent to and flush against a lower surface of each supporting tool bar 21. In this orientation, each angle iron 62 also has an upright flange 64 that extends downwardly away from the horizontal flange 63 and away from the tool bar 21 at a right angle.

The two angle irons 62 of each pair 65 are attached to the tool bars 21 so that exterior faces of each upright flange 64 of the pair 65 is facing that of the other upright flange 64 of the other angle iron 62 of the pair 65. The distance between the upright flanges 64 of the pair 65 is slightly greater than the thickness of a shank 10 where said thickness is about one and one-quarter of an inch.

The means by which each angle iron 62 is fixed to the tool bars 21 includes two metal plates 68 that are placed upon a top surface of each of the tubular tool bars 21 between which the iron 62 is to be fastened. Each plate 68 is constructed from sheet metal, is rectangularly shaped with a length greater than twice its width, and has holes near both of said plates' 68 ends. There are two tabs that extend downwardly from a bottom surface of the plates 68. The space between the tabs is slightly greater than a width of a tool bar 21 measured along a line parallel to the direction of draft. When the plate 68 is installed upon a tool bar 21, one tab each extends downward alongside a back surface and a front surface of said tool bar 21, thereby forming a saddle about said tool bar 21. The tabs limit the plate's 68 motion with respect to the tool bar 21 in a direction parallel to the direction of draft.

The horizontal flange 63 of each angle iron 62 has sets of two holes near each end of said iron 62 where each of said sets has a distance between the two holes of the set equal to the distance between the holes in each plate 68. The two plates 68 and the angle iron 62 are positioned about the tool bars 21 between which said iron 62 is to be fastened, one plate 68 above each bar 21 and the angle iron 62 below and extending beneath each of the bars 21. Each plate 68 is oriented so that the holes in said plate 68 align vertically with the holes of one of the sets of holes in the iron 62 below said plate 68. Bolts are connected through the aligned holes of each plate 68 and the angle iron 62 beneath said plate. Nuts are then applied to each bolt extending vertically between the plates 68 and the irons 62. The nuts are then advanced along the bolt until the plate 68 and iron 62 are drawn tightly about both tool bars 21 thereby limiting motion of the angles 62 relative to the bars 21.

The plows 07 are fastened to the frame 20 by mounting connection 60 where each connection 60 includes a series of holes 66 through a mid-section of upright flanges 64. In the embodiment shown, there are three holes in the series 66. The shank 10 of the plow 07 has a group of offset holes 61 through a top 14 of said shank 10. In the embodiment shown, there are four holes in the group of offset holes 61. The orientation of the holes 61 is determined by the desirable positions for each plow 07 as said plow 07 is drawn through the ground. The connection between the subsoil plow 07 and the frame 20 is accomplished by placing the shank 10 of said subsoil plow 07 between the upright flanges 64 of one of the pairs of angle irons 65 and aligning two holes of the offset holes 61 and two holes of the series of holes 66 and securing bolts through those aligned holes. By altering the hole alignments of the mounting connection 60, a wing 30 may be inclined at differing angles. In the preferred embodiment, the settings would be at five degree increments measured along a top surface of the wing. The different degrees of incline will be determined by the amount of desired lift of the soil and the added drag experienced because of the increased inclination.

The shank 10 has a leading edge 12, a trailing edge 13, the top 14, a bottom 16, and two lateral sides 18. When the subsoil plow 07 is mounted to the frame 20 as described above, the shank 10 is upright and extends below the tool bars 21. The four offset holes 61 are located at the top 14 of the shank 10. Planar surfaces of the lateral sides 18 of the shank 10 are parallel to the direction of draft and are perpendicular to the lengthwise axes of the tool bars 21. The leading edge 12 is linear and when the plow 07 is mounted to the implement 05, said leading edge 12 is at an angle to vertical with the bottom 16 more advanced along the direction of travel than the top 14. The trailing edge 13 of the shank 10 comprises a straight portion and a curvilinear portion. An upper portion of the trailing edge 13 near the top 14 is straight and parallel to the leading edge. A lower portion of the trailing edge 13 curves forward and joins the leading edge at the bottom 16.

When the shank 10 is mounted to the frame 20 the leading edge 12 of the shank is nearest the means for drafting the implement 05. The trailing edge 13 of the shank 10 is opposite the leading edge 12 and is away from the means for drafting the implement 05. When moving in the direction of travel, the leading edge 12 encounters unbroken soil before the trailing edge 13 passes through that same soil.

Welded at the bottom 16 of the shank 10 is the wing 30. In one embodiment of the subsoil plow 07 a wing 30 extends outwardly away from the shank 10 at one of the lateral sides 18 of said shank 10. In another embodiment of the plow 07, there are two wings 30, one each extending from either side of the shank 10 at the lateral sides 18 of said shank 10. With one wing 30 attached to a shank 10, the subsoil plow 07 is generally L-shaped. When two wings 30 are fixed to the shank 10, the subsoil plow 07 takes the general shape of an upside down letter "T". Both the L-shape and the inverted T-shape is derived from an elevational view of the shanks from a rear view of the plow implement 05.

The wing 30 includes a leading edge 32, a trailing edge 33, a main body 34, a means for resisting wear to the wing, and a lifting plate 36. The wing 30 is welded to the shank 10 along one of said wing's widthwise edges. In this configuration, a lengthwise axis of the wing 30 is perpendicular to the planar face of the lateral sides 18 of the shank 10. The leading edge 32 is closest to the means for drafting the implement 05 while the trailing edge 33 is away from the means for drafting. The main body 34 of the wing 30 is generally wedged-shaped so that the bevelled leading edge 32 has a lesser thickness than the trailing edge 33. The wedge shape of the wing 30 reduces resistance as the wing 30 is drafted through the ground. Additionally, the leading edge 32 is bevelled so that it is sharper and more knifelike thereby allowing the wing to cut through the soil. Still further, there is a means for resisting wear applied to each wing. It is contemplated that a wear resistant plate 37 may be fixed to the soil engaging top surface of the wing 30 or a wear resistant layer of material may be applied to the same area of said wing 30. The top surface of the wing 30, together with the plate 37, is inclined to horizontal with the lower portion of said wing being the leading edge 32 and the higher portion being the trailing edge 33.

While it is envisioned that the wing 30 may be any length, the preferred lengths range from between ten inches and eighteen inches. With a twelve inch wing 30, there would be one spike at the distal end 35 of the wing and one spike at the bottom 16 of the shank 10. In an alternative embodiment in which the wing 30 is sixteen inches long, there would be a spike 40 at the distal end 35 of the wing 30, a spike 40 at the bottom 16 of the shank 10 and an additional spike 40 located between those two spikes 40.

The lifting plate 36 is located upon the top surface of the wing 30 near the back or trailing edge 33 of the wing 30. The plate 36 is rectangular in shape with a widthwise edge parallel to a widthwise edge of the wing 30 and a lengthwise edge parallel to a lengthwise edge of the wing 30. The plate 36 is welded to the top surface of the wing 30 and has a thickness less than one-half of an inch. Planar surfaces of the plate 36 are parallel to the top surface of the wing 30.

Spikes 40 are located at the leading edge 32. There are at least two spikes 40 per plow 07 with one of those two spikes 40 being located at a distal end 35 of the wing 30 and the other spike 40 directly ahead of the shank 10. In this manner, the spikes 40 precede the wing 30 and the shank 10 as the subsoil plow 07 progresses through the ground. Similar to the wing 30, each spike 40 has a wedge-shaped tip located at a leading edge of each of said spikes 40. Shoe 42 is placed upon each spike 40. The shoe 42 is constructed so that it may be slipped over the spike 40 where it fits snugly. The shoe 42 is then fastened to the spike 40 by inserting a pin through holes at a rear end of the shoe 42 and the spike 40.

The general shape of the shoe 42 is wedgelike. The angle at which a top surface of the shoe 42 deviates downwardly from horizontal is greater than the angle at which the top surface of the wing 30 deviates from horizontal. Because of this more severe angle of the shoe 42 top surface, a shoe tip 44 located at the most forward and lower end of the shoe 42 tends to dig or bite into the ground as it is pulled through the ground thereby tending to draw the subsoil plow 07 deeper into the soil. The primary purpose of said shoe 42 is to act as a protective covering for the spike 40. The shoe is constructed from wear resistant material and shoe tip 44 is sharpened at the shoe's 42 leading edge so that said shoe 42 parts the ground with little resistance and also resists wear when so doing. Installation and removal of the shoe 42 is made easy so that when a shoe 42 is worn from use it may be readily replaced with a new one. The shoed spike described above is not new and is commercially available.

Deflection strip 70 is fastened along the leading edge 13 of the shank 10. The strip 70 is constructed from wear resistant material and is sharpened at a leading bevelled edge 72. The deflection strip 70 precedes the shank 10 as the subsoil plow 07 is drafted through the ground. Because of the bevelled edge 72, the deflection strip 70 tends to cut through the soil and deflects said soil to the side of the shank 10 thereby reducing resistance as the subsoil plow 07 is drafted through the ground. The deflection strip 70 is attached to the shank 10 by shank bolts 67 which are installed into a recession in the shank so as not to cause projections out of the lateral sides 18 of the shank 10.

Figure 6:
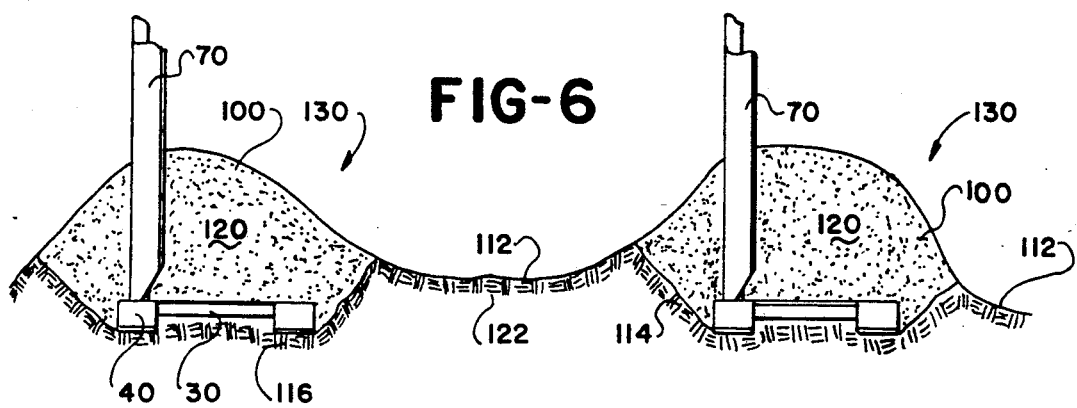
FIG. 6 is a cross-sectional view across the direction of draft showing the area of soil loosened by L-shaped plows.

In one embodiment, several L-shaped subsoil plows 07 are mounted to the frame 20 and arranged so as to form subsoil shank pairs 11. The two plows 07 of each pair 11 are oriented so that the wing 30 on each plow 07 extends away from the other plow 07 of the pair 11. In other words, each wing 30 of the pair extends in an opposite direction from the other wing 30 of said pair. In a second embodiment, L-shaped subsoil plows 07 are mounted to the frame 20 and arranged so that shank pairs are formed in which the wing 30 on each plow 07 extends inwardly, toward the other plow of the pair. This embodiment is illustrated in FIG. 1 of the drawings. In a third embodiment, L-shaped subsoil plows 07 are mounted to the frame 20 and arranged so that shank pairs are formed in which the wing 30 on each plow 07 extends in the same direction as the wing 30 of the other plow 07 of the pair. This embodiment is illustrated in FIG. 6 of the drawings. A fourth embodiment of the invention comprises inverted T-shaped plows paired so that one of the two wings of each plow extends toward a wing of the other plow of the pair.

The plow implement 05 is operated by positioning the several subsoil plows 07 of an implement 05 at the desired depth below the ground's surface. Because of the incline of the top surface of the wing 30 and the shoes 42, each subsoil plow 07 tends to dig deeper into the ground as the plow implement 05 is drafted through the soil. During operation, the position of the wing 30 below the ground's surface is fixed together with the elevationally fixed frame 20 above the ground's surface. In this way, as the subsoil plow 07 is drafted through the ground the shoe tips 44 initially break the ground and begin the loosening process. Because of the angle at which the shoe tip 44 initially encounters the soil, there is an immediate downward digging into said soil by the shoe 42. There is no tendency for the shoe 42 to skid across the ground or over the soil because of the shoe's 42 angle of attack into the ground.

Because the shoe 42 is wedge-shaped and continues the breaking process as said shoe 42 progresses travel through the soil, the ground is already partially loosened when encountered by the wing 30 and shank 10. In this way the wing 30 and shank 10 encounter ground that has been initially broken and therefore is less resistant to each component's progress through that area of soil. Because of the incline of the top surface of the wing 30 and the plow's elevationally fixed position, the soil above said wing 30 is lifted and further loosened as the wing 30 proceeds through the ground. Because of the orientation of the deflection strip 70, the soil in front of the shank 10 is first cut by the leading bevelled edge 72 of the strip 70. The soil is then deflected to the side of the shank 10. The shank 10 cuts through the soil with less resistance because of the strip 70.

Because of the subsoil plow's 07 construction, the intended ground is thoroughly loosened as the plow 07 passes through the compacted ground. Breaking and loosening of the soil occurs directly above the wing as well as at angles upward from the distal end 35 of the wing and the bottom 16 of the shank 10. The patterns of breakage and areas of loosened soil 120 may be seen in FIGS. 6 through 8.

Figure 8:
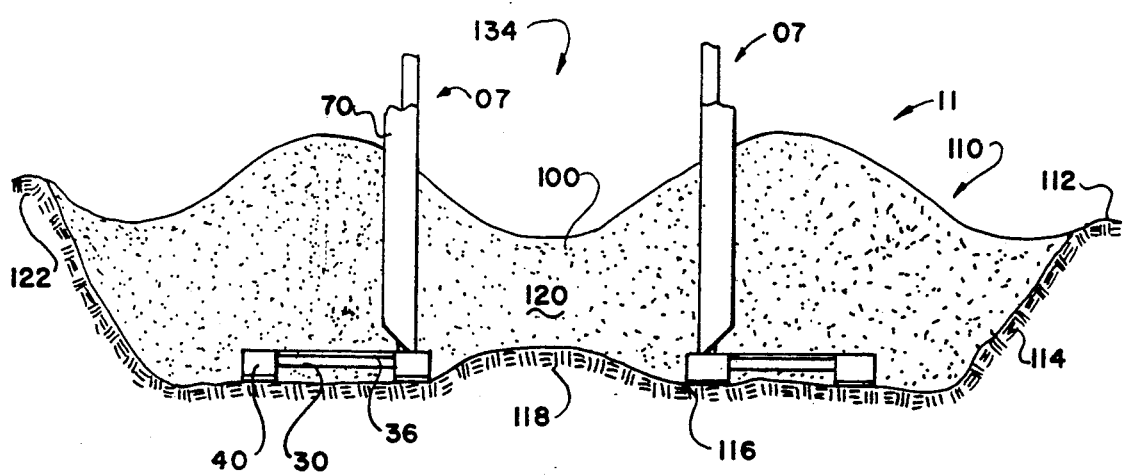
FIG. 8 is a cross-sectional view across the direction of draft showing the area of soil loosened by paired L-shaped plows.

In the paired configuration described above, a uniquely shaped strip of plowed ground 100 is created as the implement 05 is drafted through the soil. A paired L-shaped plow's loosening configuration 134 is shown in FIG. 8. Bottom limits 116 of the loosened soil are defined by the wings 30 as said wings 30 are drawn through the ground. Between the two shanks 10 of the pair 11 is a mound shaped projection 118 of unbroken ground that extends up into a joined area of loosened soil between the shanks 10 of the pair 11.

Figure 7:
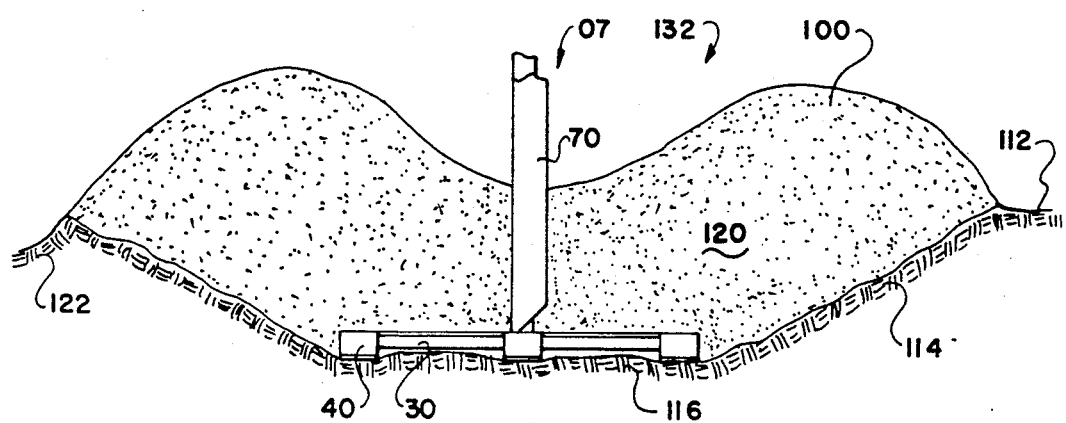
FIG. 7 is a cross-sectional view across the direction of draft showing the area of soil loosened by a T-shaped plow.

Strips of plowed ground 100 of alternative cross-sectional shapes may be created as desired by altering the configuration of the wings 30 attachment to the shank 10. In the inverted T-shaped embodiment described earlier, a wing 30 is attached to each lateral side 18 of the shank. In that configuration, an inverted T-shaped plow loosening configuration 132 is created as shown in FIG. 7.

Still an additional alternative embodiment arranges the subsoil plows 07 at distances apart from each other so that the areas of loosened soil for adjacent plows 07 do not join the other. In this configuration there is a distance of compacted soil between each of the consecutive strips of loosened soil. A cross-section of distanced L-shaped plows loosening configuration 130 is shown in FIG. 6. By having the strips of undisturbed soil 122 between the strips of loosened soil, the wheels of a drafting tractor are provided a stabilized base for traction.

The embodiments shown and described above are only exemplary. I do not claim to have invented all the parts, elements or steps described. Various modifications can be made in the construction, material, arrangement, and operation, and still be within the scope of my invention.

The restrictive description and drawings of the specific examples above do not point out what an infringement of this patent would be, but are to enable one skilled in the art to make and use the invention. The limits of the invention and the bounds of the patent protection are measured by and defined in the following claims.

I claim as my invention:
1. A plowing implement having
   a. a shank mounted to
   b. a frame,
   c. means connected to the frame for drafting the frame in a direction of draft,
   d. the shank having:
      (i) a top,
      (ii) a bottom,
      (iii) a leading edge, and
      (iv) a trailing edge,
   e. the leading edge of the shank in the direction of draft, f. a spike attached at the bottom of the shank at the leading edge of said shank and preceding said shank, g. the trailing edge is opposite the leading edge, and h. the shank has two planar lateral sides parallel to the direction of draft;

wherein the improvement comprises in combination with the above:

j. a wing fixed to at least one of the lateral sides at the bottom of the shank, k. at least one spike located on a leading edge of the wing, and l. said shank having a length sufficient to place the wing at least two feet below the grounds' surface during operation, m. each wing having a lifting plate located upon the top surface of the wing at the trailing edge of said wing, n. the lifting plate having a top surface parallel to the top surface of the wing and elevated thereabove, o. the lifting plate extends along the entire length of the wing, and p. each spike is positioned so that the entire spike is at a lower elevation than the top surface of the wing.

2. The invention as defined in claim 31 further comprising:

r. said lifting plate has a thickness less than one-half of an inch.

3. The invention as defined in claim 32 further comprising:

q. each spike is capped by a removable shoe having a shoe tip at a lower elevation than any portion of the wing.

4. The invention as defined in claim 1, further comprising:

q. each spike on the wing is a projection of a main body to which said spike is attached.

5. The invention as defined in claim 4 further comprising:

r. a wear-resistant shoe fastened to each spike.

6. The invention as defined in claim 1 further comprising:

q. a deflection strip fixed to the leading edge of the shank.

7. The invention as defined in claim 6 further comprising:

r. the deflection strip fixed to the shank so that a leading beveled edge of said strip engages the ground ahead of said shank first as the plowing implement is pulled through the ground, and s. the deflection strip is oriented at an angle that directs displaced soil to a side of the shank.

8. The invention as defined in claim 1 further comprising:

q. a mounting connection interconnecting the shank and frame that allows different settings so that an angle to horizontal at which a top surface of the wing is oriented while being drafted through the ground may be varied.

9. The invention as defined in claim 8 further comprising:

r. said mounting connection fastens the shank to the frame.

10. The invention as defined in claim 9 wherein the mounting connection includes:

s. holes in the shank, t. holes in the frame, and u. bolts used to mount the shank to the frame by way of said bolts' fixation through aligned holes in said shank and said frame.

11. The invention as defined in claim 10 further comprising:

v. the holes in the shank number four.

12. The invention as defined in claim 1 further comprising:

q. the wing is rectangular in shape and has a length, width, and thickness, r. the wing is fixed to the shank so that the lateral sides of the shank are transverse to a lengthwise axis of the wing, and s. the wing is oriented so that a top surface of the wing is inclined to horizontal.

13. The invention as defined in claim 12 further comprising:

t. an angle between the lengthwise axis of the wing and the lateral side of the shank to which said wing is attached is a 90 degree angle.

14. The invention as defined in claim 13 further comprising:

u. the wing has a length of about one and one-half feet, v. the wing has a width of about one-half foot, and w. the wing has a thickness of about one inch.

15. The invention as defined in claim 14 further comprising:

the leading edge of the wing is bevelled so that said wing's thickness at said leading edge is less than the thickness of the wing behind said leading edge causing said wing to be wedge shaped.

16. The invention as defined in claim 15 further comprising:

y. means for preventing wear to the wing.

17. A plowing implement having:

a. a shank mounted to b. a frame, c. means connected to the frame for drafting the frame in a direction of draft, d. the shank having:
  (i) a top,
  (ii) a bottom,
  (iii) a leading edge, and
  (iv) a trailing edge, e. the leading edge of the shank in the direction of draft, f. a spike attached at the bottom of the shank at the leading edge of said shank and preceding said shank, g. the trailing edge is opposite the leading edge, and h. the shank has two planar lateral sides parallel to the direction of draft; wherein the improvement comprises in combination with the above:

j. a wing fixed to at least one of the lateral sides at the bottom of the shank, k. at least one spike located on a leading edge of the wing, said shank having a length sufficient to place said wing at least eighteen inches below the ground's surface during operation, m. each frame having more than one shank mounted to said frame, n. each shank having only one wing attached to said shank, o. shank pairs formed by orienting the wings of each of two adjacent shanks so that said wings are fixed to a lateral side of each shank of the pair so that each wing extends in an opposite direction from the other shank of the pair, and p. the two shanks of the pair are arranged upon the frame so that there is less than four feet between said shanks thereby assuring that the ground between the shank pair is broken across the entire distance between said shank pair.

18. The invention as defined in claim 17 further comprising:

q. each spike on the wing is a projection of a main body to which said spike is attached;

r. a wear-resistant shoe fastened to each spike, s. a deflection strip fixed to the leading edge of the shank, t. the deflection strip fixed to the shank so that a leading beveled edge of said strip engages the ground ahead of said shank first as the plowing implement is pulled through the ground, u. the deflection strip is oriented at an angle that directs displaced soil to a side of the shank.

v. a mounting connection interconnecting the shank and frame that allows different settings so that an angle to horizontal at which a top surface of the wing is oriented while being drafted through the ground may be varied, w. said mounting connection fastens the shank to the frame, x. holes in the shank, y. holes in the frame, z. bolts used to mount the shank to the frame by way of said bolts' fixation through aligned holes in said shank and said frame, aa. the holes in the shank number four, bb. the wing is rectangular in shape and has a length, width, and thickness, cc. the wing is fixed to the shank so that the lateral sides of the shank are transverse o a lengthwise axis of the wing, dd. the wing is oriented so that the top surface of the wing is inclined to horizontal, ee. an angle between the lengthwise axis of the wing and the lateral side of the shank to which said wing is attached is a 90 degree angle, ff. the wing has a length of about one and one-half feet, gg. the wing has a width of about one-half foot, hh. the wing has a thickness of about one inch, ii. a lifting plate located on the top surface of the wing near the trailing edge of said wing, and jj. the leading edge of the wing is bevelled so that said wing's thickness at said leading edge is less than the thickness of the wing behind said leading edge causing the wing to be wedge shaped.

19. A method for plowing the ground involving a plowing implement having the following novel structure:

a. a shank mounted to b. a frame, c. means connected to the frame for drafting the frame in a direction of draft, d. the shank having:
 (i) a top,
 (ii) a bottom,
 (iii) a leading edge, and
 (iv) a trailing edge, e. the leading edge of the shank in the direction of draft, f. a spike attached at the bottom of the shank at the leading edge of said shank and preceding said shank, g. the trailing edge is opposite the leading edge, h. the shank has two planar lateral sides parallel to the direction of draft, j. a wing fixed to at least one lateral sides at the bottom of the shank, k. at least one spike located on a leading edge of the wing, and l. said shank having a length sufficient to place the wing at least two feet below the ground's surface during operation, wherein the improved method comprises:

m. plowing the ground with the above described structure and thereby n. creating a strip of loosened soil by o. positioning the shank so that each wing at the bottom of said shank is below the ground's surface at a depth exceeding eighteen inches, p. drafting the plowing implement through the ground so that the soil is broken and loosened by said implement, q. causing breakage of the soil at an angle upward from a distal end of each wing, r. causing breakage of the soil at an angle upward from the bottom of the shank, s. defining bottom limits of the strip with the wing, t. maintaining the ground outside the strip in its original compaction so that said ground retains its ability to support weight, u. having more than one shank mounted to the frame, v. creating an individual loosened strip of soil with each shank, w. distancing each shank along a length of the frame so that the strip of loosened soil created by each shank is separate from other created strips and thereby x. separating the individual loosened strips with strips of undisturbed compacted soil.

20. A method for plowing the ground involving a plowing implement having the following novel structure:

a. a shank mounted to b. a frame, c. means connected to the frame for drafting the frame in a direction of draft, d. the shank having:
 (i) a top,
 (ii) a bottom,
 (iii) a leading edge, and
 (iv) a trailing edge, e. the leading edge of the shank in the direction of draft, f. a spike attached at the bottom of the shank at the leading edge of said shank and preceding said shank, g. the trailing edge is opposite the leading edge, h. the shank has two planar lateral sides parallel to the direction of draft, j. a wing fixed to at least one of the lateral sides at the bottom of the shank, k. at least one spike located on a leading edge of the wing, and l. said shank having a length sufficient to place the wing at least two feet below the ground's surface during operation, wherein the improved method comprises:

m. plowing the ground with the above described structure and thereby
n. creating the strip of loosened soil by
o. positioning the shank so that each wing at the bottom of said shank is below the ground's surface at a depth exceeding eighteen inches.
p. drafting the plowing implement through the ground so that the soil is broken and loosened by said implement,
q. causing breakage of the soil at an angle upward from a distal end of each wing,
r. causing breakage of the soil at an angle upward from the bottom of the shank,
s. defining bottom limits of the strip with the wing,
t. maintaining the ground outside the strip in its original compaction so that said ground retains its ability to support weight,
u. having more than one shank mounted to the frame,
v. arranging the shanks so that pairs of shanks are created,
w. limiting the distance between both shanks of a pair so that the strip of soil loosened by each shank adjoins the strip loosened by the other shank of the pair thereby
x. forming a single strip of loosened ground where said strip has a cross-sectional area greater than either of the individual strips created by each shank of the pair.

21. The method as defined in claim 20 further comprising:
y. creating basins within the ground with the strips of loosened soil,
z. forming water resistant boundaries with the compacted sides and bottom of the strip,
aa. forming a moisture retaining medium with the loosened soil within the strip.

22. The method as defined in claim 21 further comprising:
bb. preceding the wing and the shank with shoe covered spikes as the plowing implement is drafted through the ground,
cc. beginning the breaking process of the soil with wedge shaped spikes thereby
dd. reducing the resistance the wing and shank encounter as said wing and shank are drawing through the ground,
ee. continuing the breaking and loosening process of the soil as the wing and shank pass through said soil that has been initially loosened by the spikes,
ff. lifting the soil with the wing so that soil above the wing is broken apart and loosened,
gg. allowing the soil to fall back down into the space said soil had previously occupied and thereby
hh. forming the strip of plowed ground.

23. A plowing implement having:
a. a shank mounted to
b. a frame,
c. means connected to the frame for drafting the frame in a direction of draft,
d. the shank having:
 (i) a top,
 (ii) a bottom,
 (iii) a leading edge, and
 (iv) a trailing edge,
e. the leading edge of the shank in the direction of draft,
f. a spike attached at the bottom of the shank at the leading edge of said shank and preceding said shank,
g. the trailing edge is opposite the leading edge, and
h. the shank has two planar lateral sides parallel to the direction of draft;
wherein the improvement comprises in combination with the above:
j. a wing fixed to at least one of the lateral sides at the bottom of the shank,
k. at least one spike located on a leading edge of the wing,
l. said shank having a length sufficient to place said wing at least eighteen inches below the ground's surface during operation,
m. each frame having more than one shank mounted to said frame,
n. each shank having only one wing attached to said shank,
o. shank pairs formed by orienting the wings of each of two adjacent shanks so that said wings are fixed to a lateral side of each shank of the pair so that each wing extends in a direction toward the other shank of the pair, and
p. the two shanks of the pair are engaged upon the frame so that there is less than four feet between said shanks thereby assuring that the ground between the shank pair is broken across the entire distance between said shank pair.

24. A plowing implement having:
a. a shank mounted to
b. a frame
c. means connected to the frame for drafting the frame in a direction of draft,
d. the shank having:
 (i) a top,
 (ii) a bottom,
 (iii) a leading edge, and
 (iv) a trailing edge,
e. the leading edge of the shank in the direction of draft,
f. a spike attached at the bottom of the shank at the leading edge of said shank and preceding said shank,
g. the trailing edge is opposite the leading edge, and
h. the shank has two planar lateral sides parallel to the direction of draft;
wherein the improvement comprises in combination with the above:
j. a wing fixed to at least one of the lateral sides at the bottom of the shank,
k. at least one spike located on a leading edge of the wing,
l. said shank having a length sufficient to place said wing at least eighteen inches below the ground's surface during operation,
m. each frame having more than one shank mounted to said frame,
n. each shank having only one wing attached to said shank,
o. shank pairs formed by orienting the wings of each of two adjacent shanks so that said wings are fixed to a lateral side of each shank of the pair so that each wing extends in the same direction as the wing on the other shank of the pair, and
p. the two shanks of the pair are arranged upon the frame so that there is less than four feet between said shanks thereby assuring that the ground between the shank pair is broken across the entire distance between said shank pair.

25. A method for plowing the ground involving a plowing implement having the follow novel structure:
 a. a shank mounted to
 b. a frame,
 c. means connected to the frame for drafting the frame in a direction of draft,
 d. the shank having:
  (i) a top,
  (ii) a bottom,
  (iii) a leading edge, and
  (iv) a trailing edge,
 e. the leading edge of the shank in the direction of draft,
 f. a spike attached at the bottom of the shank at the leading edge of said shank and preceding said shank,
 g. the trailing edge is opposite the leading edge,
 h. the shank has two planar lateral sides parallel to the direction of draft,
 j. a wing fixed to only one of the lateral sides of the shank at the bottom of said shank,
 k. at least one spike located on a leading edge of the wing, and
 l. said shank having a length sufficient to place the wing at least two feet below the ground's surface during operation,
wherein the improved method comprises:
 m. plowing the ground with the above described structure and thereby
 n. creating a strip of loosened soil by
 o. positioning the shank so that each wing at the bottom of said shank is below the ground's surface at least eighteen inches deep,
 p. drafting the plowing implement through the ground so that the soil is broken and loosened by said implement,
 q. causing breakage of the soil at an angle upward from a distal end of each wing,
 r. causing breakage of the soil at an angle upward from the bottom of the shank,
 s. defining bottom limits of the strip with the wing, and
 t. maintaining the ground outside the strip in its original compact so that said ground retains its ability to support weight,
 u. having more than one shank mounted to the frame,
 v. arranging the shanks so that pair of shanks are created,
 w. orienting the wings of each pair of shanks so that said wings are fixed to a lateral side of each shank and so that each wing extends toward the wing on the other shank of the pair,
 x. limiting the distance between both shanks of a pair so that the strip of soil loosened by each shank adjoins the strip loosened by the other shank of the pair thereby
 y. forming a single strip of loosened ground where said strip has a cross-sectional area greater than either of the individual strips created by each shank of the pair.

26. A method for plowing the ground involving a plowing implement having the following novel structure:
 a. a shank mounted to
 b. a frame,
 c. means connected to the frame for drafting the frame in a direction of draft,
 d. the shank having:
  (i) a top,
  (ii) a bottom,
  (iii) a leading edge, and
  (iv) a trailing edge,
 e. the leading edge of the shank in the direction of draft,
 f. a spike attached at the bottom of the shank at the leading edge of said shank and preceding said shank,
 g. the trailing edge is opposite the leading edge,
 h. the shank has two planar lateral sides parallel to the direction of draft,
 j. a wing fixed to only one of the lateral sides of the shank at the bottom of said shank,
 k. at least one spike located on a leading edge of the wing, and
 l. said shank having a length sufficient to place the wing at least two feet below the ground's surface during operation,
wherein the improved method comprises:
 m. plowing the ground with the above described structure and thereby
 n. creating a strip of loosened soil by
 o. positioning the shank so that each wing at the bottom of said shank is below the ground's surface at least eighteen inches deep,
 p. drafting the plowing implement through the ground so that the soil is broken and loosened by said implement,
 q. causing breakage of the soil at an angle upward from a distal end of each wing,
 r. causing breakage of the soil at an angle upward from the bottom of the shank,
 s. defining bottom limits of the strip with the wing, and
 t. maintaining the ground outside the strip in its original compaction so that said ground retains its ability to support weight,
 u. having more than one shank mounted to the frame,
 v. arranging the shanks so that pairs of shanks are created,
 w. orienting the wings of each pair of shanks so that said wings are fixed to a lateral side of each shank and so that each wing extends in an opposite direction from the wing on the other shank of the pair,
 x. limiting the distance between both shanks of a pair so that the strip of soil loosened by each shank adjoins the strip loosened by the other shank of the pair thereby
 y. forming a single strip loosened ground where said strip has a cross-sectional area greater than either of the individual strips created by each shank of the pair.

27. A method for plowing the ground involving a plowing implement having the following novel structure:
 a. a shank mounted to
 b. a frame,
 c. means connected to the frame for drafting the frame in a direction of draft,
 d. the shank having:
  (i) a top,
  (ii) a bottom,
  (iii) a leading edge, and
  (iv) a trailing edge, e. the leading edge of the shank in the direction of draft,
f. a spike attached at the bottom of the shank at the leading edge of said shank and preceding said shank,
g. the trailing edge is opposite the leading edge,
h. the shank has two planar lateral sides parallel to the direction of draft,
j. a wing fixed to only one of the lateral sides of the shank at the bottom of said shank,
k. at least one spike located on a leading edge of the wing, and
l. said shank having a length sufficient to place the wing at least two feet below the ground's surface during operation,
wherein the improved method comprises:
m. plowing the ground with the above described structure and thereby
n. creating a strip of loosened soil by
o. positioning the shank so that each wing at the bottom of said shank is below the ground's surface at least eighteen inches deep,
p. drafting the plowing implement through the ground so that the soil is broken and loosened by said implement,
q. causing breakage of the soil at an angle upward from a distal end of each wing,
r. causing breakage of the soil at an angle upward from the bottom of the shank,
s. defining bottom limits of the strip with the wing, and
t. maintaining the ground outside the strip in its original compaction so that said ground retains its ability to support weight,
u. having more than one shank mounted to the frame,
v. arranging the shanks so that pairs of shanks are created,
w. orienting the wings of each pair of shanks so that said wings are fixed to a lateral side of each shank and so that each wing extends in the same direction as the wing on the other shank of the pair,
x. limiting the distance between both shanks of a pair so that the strip of soil loosened by each shank adjoins the strip loosened by the other shank of the pair thereby
y. forming a single strip of loosened ground where said strip has a cross-sectional area greater than either of the individual strips created by each shank of the pair.

28. A plowing implement having;
a. a shank mounted to
b. a frame,
c. means connected to the frame for drafting the frame in a direction of draft,
d. the shank having:
   (i) a top,
   (ii) a bottom,
   (iii) a leading edge, and
   (v) a trailing edge,
e. the leading edge of the shank in the direction of draft,
f. a spike attached at the bottom o the shank at the leading edge of said shank and preceding said shank,
g. the trailing edge is opposite the leading edge, and
h. the shank has two planar lateral sides parallel to the direction of draft;
wherein the improvement comprises in combination with the above:
j. a wing fixed to at least one of the lateral sides at the bottom of the shank,
k. at least one spike located on a leading edge of the wing,
l. said shank having a length sufficient to place said wing at least eighteen inches below the ground's surface during operation,
m. each frame having ore than one shank mounted to said frame,
n. each shank having only one wing attached to said shank,
o. shank pairs formed by positioning two adjacent shanks upon the frame so that there is less than four feet between said two shanks.

29. A plowing implement having
a. a shank mounted to
b. a frame,
c. means connected to the frame for drafting the frame in a direction of draft,
d. the shank having:
   (i) a top,
   (ii) a bottom,
   (iii) a leading edge, and
   (iv) a trailing edge,
e. the leading edge of the shank in the direction of draft,
f. a spike attached at the bottom of the shank at the leading edge of said shank and preceding said shank,
g. the trailing edge is opposite the leading edge, and
h. the shank has two planar lateral sides parallel to the direction of draft;
wherein the improvement comprises in combination with the above:
j. a wing fixed to at least one of the lateral sides at the bottom of the shank,
k. at least one spike located on a leading edge of the wing, and
l. said shank having a length sufficient to place the wing at least two feet below the ground's surface during operation, and
p. each spike is positioned so that the entire spike is at a lower elevation than the top surface of the wing.

* * * * *